United States Patent [19]

Kaminsky et al.

[11] 4,085,051
[45] Apr. 18, 1978

[54] SELF-CLEANING FILTER FOR CLEANING LIQUIDS FROM SUSPENDED MATTER

[76] Inventors: Igor Viktorovich Kaminsky, ulitsa Lenina, 51, kv. 12; Vladimir Vladimirovich Shestakov, ulitsa Lesichanskaya, 41, kv. 30; Genrikh Fedorovich Severov, ulitsa Pervomaiskaya, 29, kv. 41; Aron Iosifovich Zaitsev, ulitsa Donetskaya, 58, kv. 40; Alexandr Fedorovich Litvinenko, ulitsa Sverdlova, 8, kv. 39, all of Severodonetsk Voroshilovgradskoi oblasti; Viktor Vasilievich Melnikov, ulitsa Dokuchaeva, 11, kv. 28; Boris Semenovich Zats, ulitsa Karpinskogo, 22, kv. 17, both of Penza; Mark Usherovich Miropolsky, ulitsa 3 Tverskaya-Yamskaya, 50, kv. 11; David Lvovich Maizlik, Ljusinovskaya ulitsa, 72, kv. 89, both of Moscow, all of U.S.S.R.

[21] Appl. No.: 661,515

[22] Filed: Feb. 26, 1976

[51] Int. Cl.² .............................................. B01D 35/16
[52] U.S. Cl. .................................. 210/333 R; 210/411
[58] Field of Search ................................. 210/333, 411

[56] References Cited
U.S. PATENT DOCUMENTS

| 2,946,447 | 7/1960 | Welz | 210/333 |
| 3,187,898 | 6/1965 | Baker | 210/333 |
| 3,640,395 | 2/1972 | Kinney | 210/411 |

FOREIGN PATENT DOCUMENTS

| 210,092 | 2/1968 | U.S.S.R. | 210/333 |

Primary Examiner—Frank A. Spear, Jr.
Assistant Examiner—E. Rollins Cross
Attorney, Agent, or Firm—Haseltine, Lake & Waters

[57] ABSTRACT

A self-cleaning filter for cleaning liquids from suspended matter comprises a container with filtering partitions which divide said container into parallel sections for the contaminated liquid and into a cleaned-liquid section located between the first two sections. Each contaminated-liquid section is provided with a device for backwashing the filtering partition, said device being installed with a provision for moving over the filtering partition, being pressed flexibly against it and comprising a hollow body which is open at the side of the filtering partition and communicates with the atmosphere. Arranged around the entire perimeter of the body at its open side is a circular recess with through holes in its bottom. In this recess is installed a mating plate capable of reciprocating therein so that there is a clearance between its face and the bottom of the recess, said clearance forming a chamber which communicates with the contaminated-liquid section through said holes. The mating plate is made of an elastic material. Such a solution ensures a high quality of cleaning of the filtering partitions with a resultant increase in the capacity and reliability of the filter.

1 Claim, 4 Drawing Figures

SELF-CLEANING FILTER FOR CLEANING LIQUIDS FROM SUSPENDED MATTER

The present invention relates to cleaning devices and more particularly it relates to self-cleaning filters for cleaning liquids from suspended matter.

The present invention can be used most successfully for cleaning river, utility and return water, industrial waste water fruit and vegetable juices and in various industries, e.g. chemical, metallurgical, paper, food, etc.

Known in the previous art are self-cleaning filters for cleaning liquids from suspended matter (see, for example, Author's Certificate No. 210,092, Cl. B01d MK, USSR) comprising: a container accommodating at least two filtering partitions which divide said container to form parallel sections for contaminated liquid and at least one section for cleaned liquid located between said first two sections; pipe connections for delivering contaminated liquid into the sections and discharging the cleaned liquid, and devices for backwashing the filtering partitions. Each backwashing device is installed in one of the contaminated-liquid sections with a provision for moving over the filtering partition, is flexibly pressed against the latter, and comprises a hollow body which is open at the side facing the filtering partition, communicates with the atmosphere and adjoins a circular mating plate at the open side along the perimeter.

The contaminated liquid is fed into these filters under pressure. Each backwashing device is mounted in a frame which is secured rigidly on a hollow drive shaft. The hollow body of said device is installed freely in the frame and connected therewith by springs which press it against the filtering partition. Each body is provided with six springs, three at each side. The mating plate is made of metal, eg. bronze, and is rigidly secured to the body.

Due to nonuniform tension of the springs, such a layout of the device causes cocking of the body with the mating plate on the filtering partition. As a result, the mating plate is subjected to heavy wear since it contacts the filtering partition only by one edge instead of by the entire surface. Besides, cocking of the mating plate creates a clearance between its lower surface and the filtering partition. The contaminated liquid leaks through this clearance past the filtering partition directly into the body of the backwashing device and is thrown out of the filter through the hollow shaft thus reducing the filter capacity.

As the filtering partition becomes gradually clogged, the pressure difference between the contaminated and clean liquid sections increases causing the filtering partition to deflect. If the mating plate is made of metal, this fails to ensure its tight contact with the filtering partition while the latter is being washed. The clearance between the mating plate and the filtering partition reduces the pressure difference between the cleaned-liquid section and the hollow shaft communicating with the atmosphere and this impairs the quality of cleaning the filtering partition from the trapped suspended matter and, in turn, reduces the capacity and reliability of the entire filter.

The main object of the invention resides in providing a self-cleaning filter for cleaning liquids from suspended matter comprising a backwashing device whose design would rule out cocking of the mating plate on the filtering partition and ensure tight contact of said plate with the filtering partition thus improving the standard of cleaning of said filtering partition, raising the capacity and reliability of the filter.

This and other objects are accomplished by providing a self-cleaning filter for cleaning liquids from suspended matter comprising a container which accommodates at least two filtering partitions, said partitions dividing the container into parallel sections for contaminated liquid and at least one section for the cleaned liquid located between the first two sections, pipe connections for delivering contaminated liquid into the sections and discharging the cleaned liquid, and device for backwashing the filtering partitions, each device being installed in one of the contaminated-liquid sections with a provision for moving over the filtering partition, being flexibly pressed against it and comprising a hollow body which is open at the side directed to the filtering partition, communicates with the atmosphere and adjoins a circular mating plate at the open side along the perimeter. According to the invention, the body of the backwashing device is provided along its entire perimeter at the side facing the filtering partition with a circular recess whose bottom has through holes and the mating plate is installed in said recess with a provision for reciprocating therein so that there is a clearance between the face of said plate and the bottom of the recess, said clearance forming a chamber which communicates with the contaminated-liquid section through said holes.

Such a solution provides additional uniform pressing of the mating plate against the filtering partition due to the utilization of the pressure built up by the contaminated liquid in the section which rules out cocking of the mating plate on the filtering partition and thus reduces its wear and raises the filter capacity.

It is practicable that the mating plate should be made of an elastic material.

Such a solution makes it possible to compensate for the clearance between the mating plate and the filtering partition caused by its deflection in case of an increased pressure difference in the sections which makes for a more efficient cleaning of the filtering partition from suspended matter. This steps up the capacity and reliability of the filter.

Now the invention will be described in detail by way of example with reference to the accompanying drawings, in which.

Figure 1:
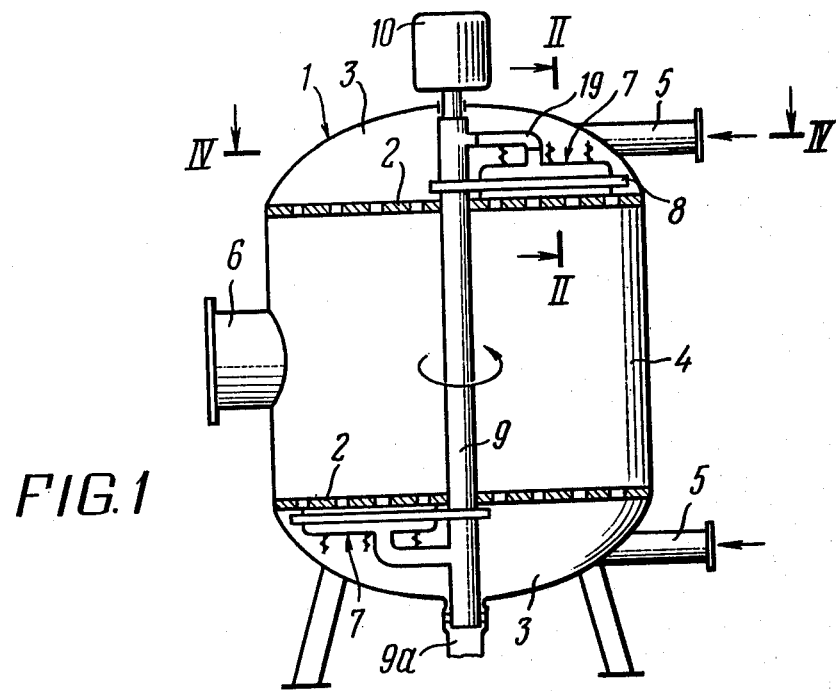
FIG. 1 is a schematic view of the self-cleaning filter for cleaning liquids from suspended matter, according to the invention.

The self-cleaning filter for cleaning liquids from suspended matter comprises a cylindrical container 1 installed vertically on a foundation (not shown in the drawing). The container accommodates filtering partitions 2 identical in shape to the cross section of the container 1; said partitions divide the container into parallel sections 3 for the contaminated liquid and a section 4 for the cleaned liquid, located between the first two sections. The container 1 is provided with pipe connections 5 for delivering contaminated liquid into the sections 3 and a pipe connection 6 for discharging the cleaned liquid from the section 4. The pressure difference between the sections 3 and 4 is minimum, ranging from 0.1 to 0.2 kgf/cm$^2$.

Figure 2:
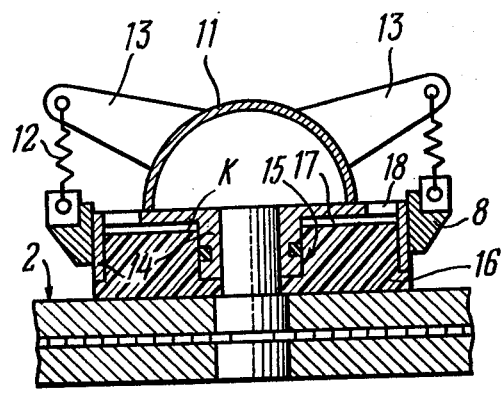
FIG. 2 is a section taken along line II—II in FIG. 1.
Figure 3:
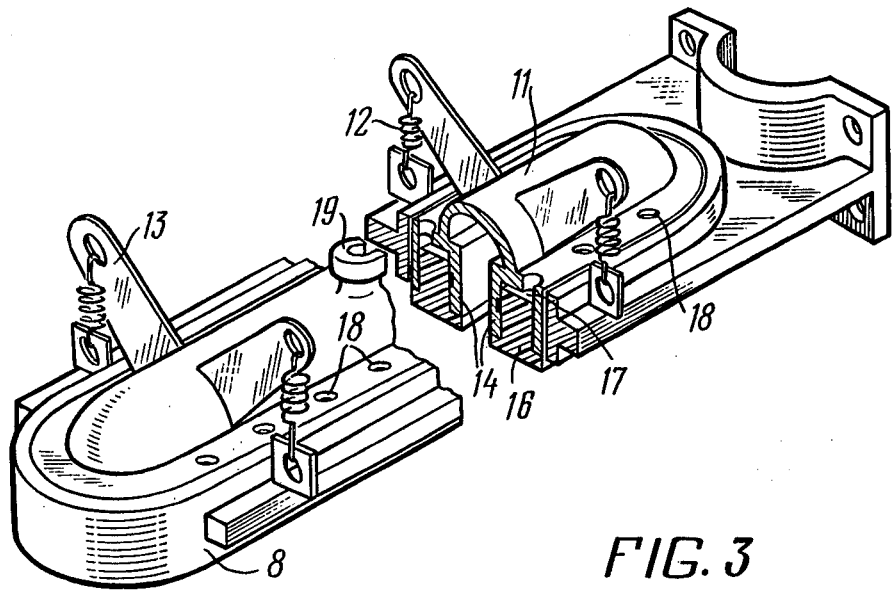
FIG. 3 is a space image of the backwashing device.
Figure 4:
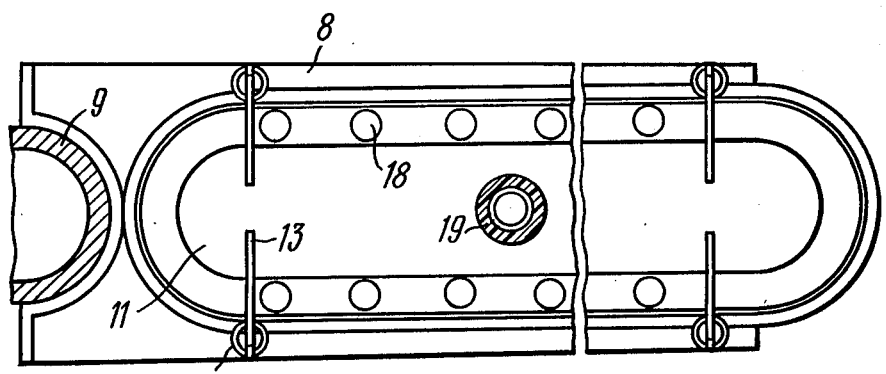
FIG. 4 is a section taken along line IV—IV in FIG. 1.

Installed in each contaminated-liquid section 3 is a device 7 for backwashing the filtering partition 2. Said device is assembled in a frame 8 rigidly secured to a hollow shaft 9 which is provided with an individual drive 10 at one of its ends. The shaft 9 is installed along the vertical axis of the container 1. The other end of the hollow shaft 9 is provided with a valve 9a communicating the inside space of the shaft with the atmosphere. The backwashing device 7 has a hollow body 11 (FIGS. 2 and 3) which is open at the side facing the filtering partition 2 as shown in FIG. 3. This body 11 has the shape of a semicylinder (as shown in FIG. 4) with closed ends and its length is equal essentially to half the diameter of the filtering partition 2. The body 11 is freely installed in the frame 8 and connected with the latter by springs 12 which are fastened at one end to the frame 8 while at the other end they are secured to a bracket 13 fastened rigidly to the body 11. These springs 12 press the backwashing device 7 flexibly against the filtering partition 2. At the bottom of the body 11, along its entire perimeter, there is a wider portion 14 provided with a circular recess 15. This recess 15 accommodates a mating plate 16 installed with a provision for reciprocating therein. According to the invention, said mating plate is made of an elastic material, e.g. polypropylene, polyethylene or caprolon. A clearance between the face K of the mating plate and the bottom of the recess 15 forms a chamber 17. The bottom of the recess 15 beyond the space of the body 11 (as shown in FIG. 3) has through holes 18 (FIGS. 2 and 3) which put the chamber 17 in communication with the contaminated-liquid section 3. The body 11 is communicated in a conventional manner by a flexible hose 19 (FIG. 1) with a hollow shaft 9 which communicates with the atmosphere through the valve 9a.

The self-cleaning filter functions as follows.

The contaminated liquid is delivered under pressure through the pipe connections 5 into the contaminated-liquid sections 3 of the container 1. Passing through the filtering partitions 2, the liquid is cleaned of the suspended matter and enters the cleaned-liquid section 4 wherefrom it flows to the consumer through the pipe connection 6. As the filtering partitions 2 become gradually clogged, their hydraulic resistance grows which increases the pressure difference between the sections 3 and 4. As the pressure difference reaches the maximum permissible level, the valve 9a is opened and the drive 10 of the hollow shaft 9 is turned on. This causes a pressure difference in the section 4 and in the bodies 11 of the backwashing devices 7 which communicate with the atmosphere through the hollow shaft 9 and are pressed by springs 12 against the filtering partitions 2. As a result, part of the cleaned liquid moves in a counterflow through the filtering partitions 2 in the zones occupied at the moment by the devices 7 and washes off the trapped suspended matter into the body 11 of the backwashing device 7 wherefrom said suspended matter is removed through the hollow shaft 9.

The contaminated liquid flows through the holes 18 in the bottom of the recess 15 into the chamber 17 and builds up a pressure therein which is equal to the pressure in the sections 3. As a result, the mating plate 16 is pressed still more tightly against the surface of the filtering partition, thus ensuring tight contact between them. The backwashing device 7 rotates together with the shaft 9 around the vertical axis of the container 1, moving over the entire surface of the filtering partition and cleaning it from the suspended matter trapped from the liquid.

As the initial pressure difference between the sections 3 and 4 is restored, the process of washing the filtering partition 2 is completed. The valve 9a is closed and the drive 10 of the shaft is turned off.

As the filtering partition 2 becomes again clogged, its washing is repeated and can be carried out on an automatic principle.

What we claim is:

1. A self-cleaning filter for cleaning liquids from suspended matter comprising: a container; at least two filtering partitions installed in said container; sections for contaminated liquid arranged parallel to each other and formed in said container by said filtering partitions; at least one section for cleaned liquid also formed in said contaminated liquid sections; pipe connections for delivering contaminated liquid into said sections and discharging the cleaned liquid; devices for backwashing the filtering partitions, each device being installed in one of said contaminated-liquid sections with a provision for moving over said filtering partition, each device having a mating plate pressed flexibly against said partition and having a hollow body communicating with the atmosphere and open at the side facing said filtering partition; said body having a circular recess at the opening side along the entire perimeter, the bottom wall of said recess having through holes; said mating plate being installed in said recess with means for upward movements therein so that there is a clearance between its face and the bottom wall of the recess, said clearance forming a chamber communicating with said contaminated-liquid section through the holes in the bottom wall of the recess; said device having a spring-biased duct pressed against the filtering partition by pressure of liquid admitted through ports and chamber in said hollow body, said duct being vertically movable relative to said filtering partition, said mating plate being movable directly over said filtering partition, said mating plate being comprised of elastic material, said filtering partitions comprising two perforated metal discs with filtering material therebetween, liquid being filtered through both filtering partitions simultaneously, said filtering partitions being cleaned with backflow of liquid only in areas covered by said ducts, cleaning occuring simultaneously with filtering over the remainder of the surface of said filtering partitions, the entire filtering surface area being washed successively when said ducts are moved, flexible hose means for removing suspended mechanical particles arrested by said filtering partitions, said flexible hose means connecting the interior spaces of said ducts to a hollow shaft.

* * * * *